United States Patent [19]

Liu et al.

[11] Patent Number: 4,598,117

[45] Date of Patent: Jul. 1, 1986

[54] ELASTOMERIC COMPOSITIONS COMPRISING A COMBINATION OF (A) AN AROMATIC THERMOPLASTIC POLYESTER AND (B) CLAY/SYENITE

[75] Inventors: Nan-I Liu; Russell J. McCready, both of Mt. Vernon, Ind.

[73] Assignee: General Electric Company, Pittsfield, Mass.

[21] Appl. No.: 691,027

[22] Filed: Jan. 11, 1985

[51] Int. Cl.$^4$ .................. C08K 3/34; C08L 77/00; C08G 63/68; C08G 73/16

[52] U.S. Cl. ............................ 524/444; 524/445; 524/447; 524/450; 524/539; 524/600; 524/602

[58] Field of Search ............... 524/444, 445, 450, 447, 524/600, 602, 539

[56] References Cited

U.S. PATENT DOCUMENTS

| | | | |
|---|---|---|---|
| 3,236,895 | 2/1966 | Lee | 260/584 |
| 3,274,159 | 9/1966 | Kluber | 260/75 |
| 3,355,427 | 11/1967 | Loncrini | 260/47 |
| 3,461,136 | 8/1969 | Pruckmayr | 260/326 |
| 3,555,113 | 1/1971 | Sattler | 260/858 |
| 3,654,370 | 4/1972 | Yeakey | 260/584 |
| 3,695,929 | 10/1972 | Sattler | 428/383 |
| 3,907,926 | 9/1975 | Brown et al. | 524/258 |
| 3,975,330 | 8/1976 | Suzuki | 528/289 |
| 4,127,553 | 11/1978 | Osada et al. | 260/33.2 |
| 4,203,887 | 5/1980 | Goedde et al. | 524/262 |
| 4,230,838 | 10/1980 | Foy et al. | 528/408 |
| 4,307,226 | 12/1981 | Bolon et al. | 528/288 |
| 4,331,786 | 5/1982 | Foy et al. | 528/408 |
| 4,337,192 | 6/1982 | Campbell | 524/539 |
| 4,361,680 | 11/1982 | Borg et al. | 525/420 |
| 4,362,861 | 12/1982 | Shen | 528/289 |
| 4,371,692 | 2/1983 | Wolfe | 528/289 |
| 4,371,693 | 2/1983 | Wolfe, Jr. | 528/292 |
| 4,373,067 | 2/1983 | Dieck et al. | 524/539 |
| 4,390,686 | 6/1983 | Janssen et al. | 528/289 |
| 4,467,057 | 8/1984 | Dieck et al. | 525/444 |
| 4,469,851 | 9/1984 | Charles et al. | 524/539 |

FOREIGN PATENT DOCUMENTS

| | | |
|---|---|---|
| 1466708 | 1/1966 | France . |
| 1551605 | 1/1968 | France . |
| 2198975 | 5/1974 | France . |
| 1431916 | 4/1976 | United Kingdom . |

OTHER PUBLICATIONS

Honore, P. et al., "Synthesis and Study of Various Reactive Oligomers and of Poly(Ester–Imide–Ether)s", European Polymer Journal, V16, pp. 909–916, 10/12/79.

Texaco Chemical Company, "Jeffamine ® Polyoxypropyleneamines", 1978.

"Polyimides", Encyclopedia of Chemical Technology, 1971 Supp., vol. 1, pp. 740–773.

*Primary Examiner*—Herbert J. Lilling
*Attorney, Agent, or Firm*—Edward K. Welch, II; William F. Mufatti; John W. Harbour

[57] ABSTRACT

Novel thermoplastic molding compositions comprising a thermoplastic elastomer and a modifying combination of an aromatic thermoplastic polyester and clay.

33 Claims, No Drawings

ELASTOMERIC COMPOSITIONS COMPRISING A COMBINATION OF (A) AN AROMATIC THERMOPLASTIC POLYESTER AND (B) CLAY/SYENITE

The present invention relates to novel thermoplastic elastomeric molding compositions having excellent physical characteristics for a number of end use applications. An especially preferred subset of these novel compositions are capable of withstanding high temperatures and are able to absorb high energy and "spring back" with little or no permanent deformation upon impact. Specifically, the compositions of the instant invention comprise polyetherimide esters or polyetherester imides having admixed therewith a combination of an aromatic polyester, most preferably poly(butylene terephthalate), and a mineral filler selected from the group consisting of clay and syenite.

Polyether ester imides are well known having been described in numerous publications and patents including for example, Honore et al, "Synthesis and Study of Various Reactive Oligmers and of Poly(ester-imideether)s", *European Polymer Journal* Vol. 16, pp. 909–916, Oct. 12, 1979; and in Kluiber et al, U.S. Pat. No. 3,274,159 and Wolfe Jr., U.S. Pat. Nos. 4,371,692 and 4,371,693, respectively. More recently, McCready in pending U.S. patent application Ser. No. 665,277 filed Oct. 26, 1984, disclosed a novel class of polyetherimide esters having superior elastomeric and other desired characteristics.

While the foregoing polymers having ether, imide and ester units have many desired properties including good flexibility, impact strength and moldability, these compositions have very poor heat sag resistance. Thus, molded parts from these compositions severely sag upon exposure to high temperatures, e.g. greater than 250° F. Additionally, because of the high flexibility of these materials as demonstrated by their very low flexural modulus, these compositions are limited to certain applications where physical integrity or stiffness of the part is not desired.

It is an object of the present invention to provide thermoplastic molding compositions which are able to withstand high temperatures such as for example temperatures present in baking ovens for painted parts, with little or no deformation or sag.

It is also an object of the present invention to provide thermoplastic molding compositions of sufficient elastomeric nature such that they are able to absorb and withstand high energy impact and "spring back" to their previous state or shape upon removal of the impinging energy with little or no permanent deformation.

Furthermore, it is an object of the present invention to provide thermoplastic molding compositions which are able to withstand high energy deflection without rupture.

It has now been discovered that thermoplastic molding compositions may be prepared which overcome the foregoing deficiencies and have good overall physical characteristics including high strength and stress-strain properties, good impact resistance and good moldability.

SUMMARY

In accordance with the present invention there are provided novel thermoplastic compositions comprising an admixture of (a) one or more thermoplastic elastomeric polymers characterized as having ether, ester and imide linkages and wherein the ether linkages are present as high molecular weight, i.e. MW of from about 400 to about 12000, polyoxyalkylene or copolyoxyalkylene units derived from long chain ether glycols and/or long chain ether diamines, and (b) a modifying amount of a combination of (i) an aromatic polyester, and (ii) a mineral filler selected from the group consisting of clay and syenite.

The novel compositions of the present invention will comprise most any combination of elastomer (a) and modifying combination of (b)(i) polyester and (b)(ii) mineral filler. However, because of the difficulty in employing high loadings of mineral fillers, it is preferred that no more than about 60 weight percent, preferably no more than about 40 weight percent, based on the total composition, of mineral filler (b)(ii) be used.

Generally, the compositions of the present invention will comprise from about 1 to 98 percent by weight, preferably from about 10 to 90 percent by weight, of elastomer (a) and from about 2 to about 99 percent by weight, preferably from about 10 to about 90 percent by weight of the combination (b) wherein the polyester component (b)(i) comprises from about 1 to about 98 percent by weight, preferably from about 5 to about 90 percent by weight, based on the total weight of (a) & (b) and the mineral filler comprises from about 1 to about 60 percent by weight, preferably 5 to about 40 percent by weight, based on the total weight of (a) & (b).

An especially preferred class of compositions encompassed by the present invention having excellent stress-strength properties, particularly as manifested by Dynatup characterization and heat sag resistance, are those wherein the amount of the combination of (b)(i) aromatic polyester and (b)(ii) mineral filler present will be from about 10 to about 80 weight percent based on the total weight of (a) and (b) and wherein (b)(i) and (b)(ii) will each be present in an amount of from about 5 to about 75 and from about 5 to about 25 weight percent, respectively, based on (a) & (b). Preferred compositions are those wherein the combined weight of (b)(i) and (b)(ii) is from about 30 to about 70 weight percent and wherein (b)(i) and (b)(ii) are present in amounts of from about 20 to about 60 and about 10 to about 20 weight percent, respectively, based on the total weight of (a) & (b).

DETAILED DESCRIPTION OF THE INVENTION

Thermoplastic elastomeric polymers (a) suitable for use in the practice of the present invention are characterized as containing imide, ester and ether linkages wherein the ether linkages are present as 5 high molceular weight, i.e. from about 400 to about 12000 MW, polyoxyalkylene or copolyoxyalkylene units derived from long chain ether glycols and/or long chain ether diamines. Typically these thermoplastic elastomeric polymers are referred to as poly(etherester imide)s, poly(ester imide ethers) and poly(etherimide ester)s.

Suitable poly(etherester imide)s and poly(esterimide ether)s and their manufacture are described in, for example, Honore et al "Synthesis and Study of Various Reactive Oligomers and of Poly(esterimide ethers)", European Polymer Journal, Vol. 16 pp. 909–916, Oct. 12, 1979 and in Wolfe Jr., U.S. Pat. Nos. 4,371,692 and 4,371,693, herein incorporated by reference. These are characterized as comprising units of the formulas:

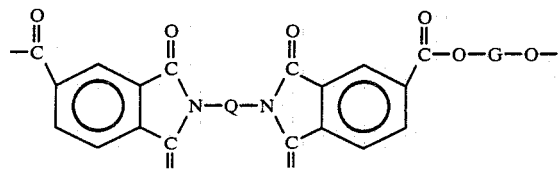

and

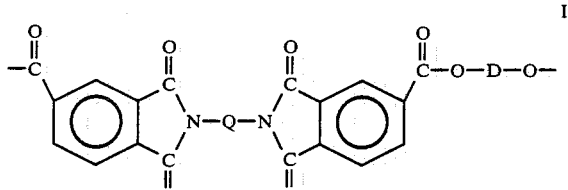

or

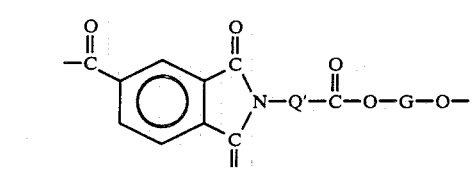

and

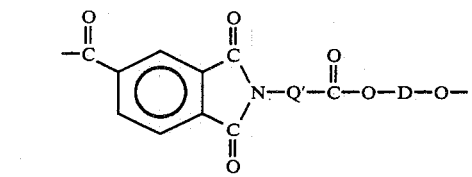

or mixtures thereof wherein G is a divalent radical remaining after the removal of terminal (or as nearly terminal as possible) hydroxyl groups from a long chain poly(oxyalkylene)glycol having a molecular of from about 400 to about 12000; D is a divalent radical remaining after the removal of hydroxyl groups from a diol having a molecular weight less than about 300; Q is a divalent radical remaining after removal of amino groups from an aliphatic primary diamine having a molecular weight of less than 350 and Q' is a divalent radical remaining after removal of an amino group and a carboxyl group from an aliphatic primary amino acid having a molecular weight of less than 250, with the proviso that from about 0.5 to about 10 D units are present for each G unit.

Each of the above esterimide units exemplified by formulas I and II and formulas III and IV contain a diimide-diacid radical or an imide-diacid radical, respectively. As described in Wolfe, these are preferably prepared by reacting the respective aliphatic diamine or amino acid with trimellitic anhydride either in a separate step prior to polymerization or during the polymerization itself.

Long chain ether glycols which can be used to provide the -G- radicals in the thermoplastic elastomers are preferably poly(oxyalkylene)glycols and copoly(oxyalkylene)glycols of molecular weight of from about 400 to 12000. Preferred poly(oxyalkylene) units are derived from long chain ether glycols of from about 900 to about 4000 molecular weight and having a carbon-to-oxygen ratio of from about 1.8 to about 4.3, exclusive of any side chains.

Representative of suitable poly(oxyalkylene)glycols there may be given poly(ethylene ether)glycol; poly(propylene ether)glycol; poly(tetramethylene ether)glycol; random or block copolymers of ethylene oxide and propylene oxide, including ethylene oxide capped poly(propylene ether)glycol and predominately poly(ethylene ether) backbone, copoly(propylene etherethylene ether)glycol; and random or block copolymers of tetrahydrofuran with minor amounts of a second monomer such as ethylene oxide, propylene oxide, or methyltetrahydrofuran (used in proportions such that the carbon-to-oxygen ratio does not exceed about 4.3). Polyformal glycols prepared by reacting formaldehyde with diols such as 1,4-butanediol and 1,5-pentanediol are also useful. Especially preferred poly(oxyalkylene)glycols are poly(propylene ether)glycol, poly(tetramethylene ether)glycol and predominately poly(ethylene ether) backbone copoly(propylene etherethylene ether)glycol.

Low molecular weight diols which can be used to provide the -D- radicals are saturated and unsaturated aliphatic and cycloaliphatic dihydroxy compounds as well as aromatic dihydroxy compounds. These diols are preferably of a low molecular weight, i.e. having a molecular weight of about 300 or less. When used herein, the term "diols" and "low molecular weight diols" should be construed to include equivalent ester forming derivatives thereof, provided, however, that the molecular weight requirement pertains to the diol only and not to its derivatives. Exemplary of ester forming derivatives there may be given the acetates of the diols as well as, for example, ethylene oxide or ethylene carbonate for ethylene glycol.

Preferred saturated and unsaturated aliphatic and cycloaliphatic diols are those having from about 2 to 19 carbon atoms. Exemplary of these diols there may be given ethylene glycol; propanediol; butanediol; pentanediol; 2-methyl propanediol; 2,2-dimethyl propanediol; hexanediol; decanediol; 2-octyl undecanediol; 1,2-, 1,3- and 1,4- dihydroxy cyclohexane; 1,2-, 1,3- and 1,4- cyclohexane dimethanol; butenediol; hexenediol, etc. Especially preferred are 1,4-butanediol and mixtures thereof with hexanediol or butenediol, most preferably 1,4-butanediol.

Aromatic diols suitable for use in the preparation of the thermoplastic elastomers are generally those having from 6 to about 19 carbon atoms. Included among the aromatic dihydroxy compounds are resorcinol; hydroquinone; 1,5-dihydroxy naphthalene; 4,4'-dihydroxy diphenyl; bis(p-hydroxy phenyl)methane and 2,2-bis(p-hydroxy phenyl) propane.

Especially preferred diols are the saturated aliphatic diols, mixtures thereof and mixtures of a saturated diol(s) with an unsaturated diol(s), wherein each diol contains from 2 to about 8 carbon atoms. Where more than one diol is employed, it is preferred that at least about 60 mole %, most preferably at least 80 mole %, based on the total diol content, be the same diol. As mentioned above, the preferred thermoplastic elastomers are those in which 1,4- butanediol is present in a predominant amount, most preferably when 1,4-butanediol is the only diol.

Diamines which can be used to provide the -Q- radicals in the polymers of this invention are aliphatic (including cycloaliphatic) primary diamines having a molecular weight of less than about 350, preferably below about 250. Diamines containing aromatic rings in which both amino groups are attached to aliphatic carbons, such as p-xylylene diamine, are also meant to be included. Representative aliphatic (and cycloaliphatic) primary diamines are ethylene diamine, 1,2-propylene diamine, methylene diamine, 1,3- and 1,4-diaminocyclohexane, 2,4- and 2,6-diaminomethylcyclohexane, m- and p-xylylene diamine and bis(4-aminocyclohexyl)methane. Of these diamines, ethylene diamine and bis(4-aminocyclohexyl)methane are preferred because they are readily available and yield polymers having excellent physical properties.

Amino acids which can be used to provide the -Q'- radicals in the polymers of this invention are aliphatic (including cycloaliphatic) primary amino acids having a molecular weight of less than about 250. Amino acids containing aromatic rings in which the amino group is attached to aliphatic carbon, such as phenylalanine or 4-(β-aminoethyl)benzoic acid, are also meant to be included. Representative aliphatic (and cycloaliphatic) primary amino acids are glycine, alanine, β-alanine, phenylalanine, 6-aminohexanoic acid, 11-aminoundecanoic acid and 4-aminocyclohexanoic acid. Of these amino acids, glycine and β-alanine are preferred because they are readily available and yield polymers having excellent physical properties.

A second and preferred class of thermoplastic elastomers (a) suitable for use in the practice of the present invention are the poly(etherimide esters) as described in McCready, copending U.S patent application Ser. No. 665,277 filed Oct. 26, 1984, and cofiled, copending U.S. patent application entitled "Thermoplastic Polyetherimide Ester Elastomers", both incorporated herein by reference. In general, the poly(etherimide esters) of McCready are random and block copolymers prepared by conventional processes from (i) one or more diols, (ii) one or more dicarboxylic acids and (iii) one or more polyoxyalkylene diimide diacids or the reactants therefore. The preferred poly(etherimide esters) are prepared from (i) a $C_2$ to $C_{19}$ aliphatic and/or cycloaliphatic diol, (ii) a $C_4$ to $C_{19}$ aliphatic, cycloaliphatic and/or aromatic dicarboxylic acid or ester derivative thereof and (iii) a polyoxyalkylene diimide diacid wherein the weight ratio of the diimide diacid (iii) to dicarboxylic acid (ii) is from about 0.25 to 2.0, preferably from about 0.4 to 1.4.

The diols (i) suitable for use herein are essentially the same as those used to provide the -D- radical in formulas II and IV as described above.

Dicarboxylic acids (ii) which are suitable for use in the preparation of the poly(etherimide esters) are aliphatic, cycloaliphatic, and/or aromatic dicarboxylic acids. These acids are preferably of a low molecular weight, i.e., having a molecular weight of less than about 350; however, higher molecular weight dicarboxylic acids, especially dimer acids, may also be used. The term "dicarboxylic acids" as used herein, includes equivalents of dicarboxylic acids having two functional carboxyl groups which perform substantially like dicarboxylic acids in reaction with glycols and diols in forming polyester polymers. These equivalents include esters and ester-forming derivatives, such as acid halides and anhydrides. The molecular weight preference, mentioned above, pertains to the acid and not to its equivalent ester or ester-forming derivative. Thus, an ester of a dicarboxylic acid having a molecular weight greater than 350 or an acid equivalent of a dicarboxylic acid having a molecular weight greater than 350 are included provided the acid has a molecular weight below about 350. Additionally, the dicarboxylic acids may contain any substituent group(s) or combinations which do not substantially interfere with the polymer formation and use of the polymer in the practice of this invention.

Aliphatic dicarboxylic acids, as the term is used herein, refers to carboxylic acids having two carboxyl groups each of which is attached to a saturated carbon atom. If the carbon atom to which the carboxyl group is attached is saturated and is in a ring, the acid is cycloaliphatic.

Aromatic dicarboxylic acids, as the term is used herein, are dicarboxylic acids having two carboxyl groups each of which is attached to a carbon atom in an isolated or fused benzene ring system. It is not necessary that both functional carboxyl groups be attached to the same aromatic ring and where more than one ring is present, they can be joined by aliphatic or aromatic divalent radicals or divalent radicals such as —O— or —$SO_2$—.

Representative aliphatic and cycloaliphatic acids which can be used are sebacic acid, 1,2-cyclohexane dicarboxylic acid, 1,3-cyclohexane dicarboxylic acid, 1,4-cyclohexane dicarboxylic acid, adipic acid, glutaric acid, succinic acid, oxalic acid, azelaic acid, diethylmalonic acid, allylmalonic acid, dimer acid, 4-cyclohexene-1,2- dicarboxylic acid, 2-ethylsuberic acid, tetramethylsuccinic acid, cyclopentane dicarboxylic acid, decahydro-1,5-naphthalene dicarboxylic acid, 4,4'-bicyclohexyl dicarboxylic acid, decahydro-2,6-naphthalene dicarboxylic acid, 4,4 methylenebis(cyclohexane carboxylic acid), 3,4-furan dicarboxylic acid, and 1,1-cyclobutane dicarboxylic acid. Preferred aliphatic acids are cyclohexane dicarboxylic acids, sebacic acid, dimer acid, glutaric acid, azelaic acid and adipic acid.

Representative aromatic dicarboxylic acids which can be used include terephthalic, phthalic and isophthalic acids, bi-benzoic acid, substituted dicarboxy compounds with two benzene nuclei such as bis(p-carboxyphenyl) methane, oxybis(benzoic acid), ethylene-1,2- bis-(p-oxybenzoic acid), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, and halo and $C_1$-$C_{12}$ alkyl, alkoxy, and aryl ring substitution derivatives thereof. Hydroxy acids such as p(β-hydroxyethoxy)benzoic acid can also be used provided an aromatic dicarboxylic acid is also present.

Preferred dicarboxylic acids for the preparation of the polyetherimide esters are the aromatic dicarboxylic acids, mixtures thereof and mixtures of one or more dicarboxylic acid with an aliphatic and/or cycloaliphatic dicarboxylic acid, most preferably the aromatic dicarboxylic acids. Among the aromatic acids, those with 8-16 carbon atoms are preferred, particularly the benzene dicarboxylic acids, i.e., phthalic, terephthalic and isophthalic acids and their dimethyl derivatives. Especially preferred is dimethyl terephthalate.

Finally, where mixtures of dicarboxylic acids are employed in the preparation of the poly(etherimide ester), it is preferred that at least about 60 mole %, preferably at least about 80 mole %, based on 100 mole % of dicarboxylic acid (ii) be of the same dicarboxylic acid or ester derivative thereof. As mentioned above, the preferred poly(etherimide esters) are those in which dimethylterephthalate is the predominant dicarboxylic acid, most preferably when dimethylterephthalate is the only dicarboxylic acid.

Polyoxyalkylene diimide diacids (iii) are high molecular weight diimide diacids wherein the average molecular weight is greater than about 700, most preferably greater than about 900. They may be prepared by the imidization reaction of one or more tricarboxylic acid compounds containing two vicinal carboxyl groups or an anhydride group and an additional carboxyl group, which must be esterifiable and preferably is nonimidizable, with a high molecular weight polyoxyalkylene diamine. These polyoxyalkylene diimide diacids and processes for their preparation are more fully disclosed in McCready, pending U.S. patent application Ser. No. 665,192 filed Oct. 26, 1984, incorporated herein by reference.

In general, the polyoxyalkylene diimide diacids are characterized by the following formula:

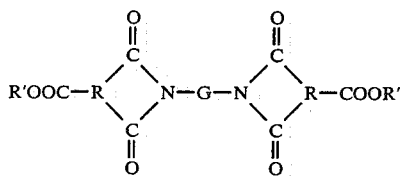

wherein each R is independently a trivalent organic radical, preferably a $C_2$ to $C_{20}$ aliphatic, aromatic or cycloaliphatic trivalent organic radical; each R' is independently hydrogen or a monovalent organic radical preferably selected from the group consisting of $C_1$ to $C_6$ aliphatic and cycloaliphatic radicals and $C_6$ to $C_{12}$ aromatic radicals, e.g. benzyl, most preferably hydrogen; and G is the radical remaining after removal of the terminal amine groups of a long chain poly(oxyalkylene)diamine equivalent to the long chain poly(oxyalkylene)glycol as described above in formulas I and III above.

The tricarboxylic component may be almost any carboxylic acid anhydride containing an additional carboxylic group or the corresponding acid thereof containing two imide-forming vicinal carboxyl groups in lieu of the anhydride group. Mixtures thereof are also suitable. The additional carboxylic group must be esterifiable and preferably is substantially nonimidizable.

Further, while trimellitic anhydride is preferred as the tricarboxylic component, any of a number of suitable tricarboxylic acid constituents will occur to those skilled in the art including 2,6,7 naphthalene tricarboxylic anhydride; 3,3',4 diphenyl tricarboxylic anhydride; 3,3',4 benzophenone tricarboxylic anhydride; 1,3,4 cyclopentane tricarboxylic anhydride; 2,2',3 diphenyl tricarboxylic anhydride; diphenyl sulfone - 3,3',4 tricarboxylic anhydride, ethylene tricarboxylic anhydride; 1,2,5 napthalene tricarboxylic anhydride; 1,2,4 butane tricarboxylic anhydride; diphenyl isopropylidene 3,3',4 tricarboxylic anhydride; 3,4 dicarboxyphenyl 3'-carboxylphenyl ether anhydride; 1,3,4 cyclohexane tricarboxylic anhydride; etc. These tricarboxylic acid materials can be characterized by the following formula:

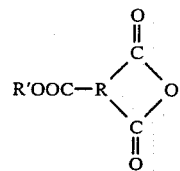

where R is a trivalent organic radical, preferably a $C_2$ to $C_{20}$ aliphatic, aromatic, or cycloaliphatic trivalent organic radical and R' is preferably hydrogen or a monovalent organic radical preferably selected from the group consisting of $C_1$ to $C_6$ aliphatic and/or cycloaliphatic radicals and $C_6$ to $C_{12}$ aromatic radicals, e.g. benzy; most preferably hydrogen.

In the preparation of the poly(etherimide ester)s, the diimide diacid may be preformed in a separate step prior to polymerization or they may be formed during polymerization itself. In the latter instance, the polyoxyalkylene diamine and tricarboxylic acid component may be directly added to the reactor together with the diol and dicarboxylic acid, whereupon imidization occurs concurrently with esterification. Alternatively, the polyoxyalkylene diimide diacids may be preformed prior to polymerization by known imidization reactions including melt synthesis or by synthesizing in a solvent system. Such reactions will generally occur at temperatures of from 100° C. to 300° C., preferably at from about 150° C. to about 250° C. while drawing off water or in a solvent system at the reflux temperature of the solvent or azeotropic (solvent) mixture. Preferred polyetherimide esters are those in which the weight ratio of the polyoxyalkylene diimide diacid (iii) to dicarboxylic acid (ii) is from about 0.25 to about 2, preferably from about 0.4 to about 1.4.

Especially preferred polyetherimide esters comprise the reaction product of dimethylterephthalate, optionally with up to 40 mole % of another dicarboxylic acid; 1,4-butanediol, optionally with up to 40 mole % of another saturated or unsaturated aliphatic and/or cycloaliphatic diol; and a polyoxyalkylene diimide diacid prepared from a polyoxyalkylene diamine of molecular weight of from about 400 to about 12000, preferably from about 900 to about 4000, and trimellitic anhydride. In its most preferred embodiments, the diol will be 100 mole % 1,4- butanediol and the dicarboxylic acid 100 mole % dimethylterephthalate.

As mentioned, the polyetherimide esters may be prepared by conventional esterification/condensation reactions for the production of polyesters. Exemplary of the processes that may be practiced are as set forth in, for example, U.S. Pat. Nos. 3,023,192; 3,763,109; 3,651,014; 3,663,653 and 3,801,547, herein incorporated by reference.

The foregoing thermoplastic elastomers (a) are modified in accordance with the teachings of the instant invention by admixing therewith a modifying amount of a combination (b) of (i) one or more thermoplastic aromatic polyesters derived from an aliphatic and/or cycloaliphatic diol and an aromatic dicarboxylic acid or its ester derivative and (ii) a mineral filler selected from the group consisting of clay and syenite.

While most any of the abovementioned aliphatic and cycloaliphatic diols and aromatic dicarboxylic acids or ester derivatives thereof may be used in the preparation of the thermoplastic aromatic polyester, preferred polyesters will have repeating units of the following general formula:

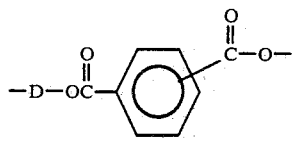

where D is as defined above in formulas II and IV for aliphatic and cycloaliphatic diols. Additionally, these polyesters may also contain minor amounts of other units such as aliphatic dicarboxylic acids and/or aliphatic polyols. Preferred polyesters include poly(butylene terephthalate), poly(ethylene terephthalate) and blends thereof, most preferably poly(butylene terephtalate).

The polyesters described above are either commercially available or can be produced by methods well known in the art, such as those set forth in U.S. Pat. Nos. 2,465,319; 3,047,539 and 2,910,466, herein incorporated by reference.

Mineral fillers (b)(ii) suitable for use in the practice of the present invention are selected from the group consisting of clays and syenite.

The syenites are inorganic feldspathic minerals which are widely known and commercially available. A preferred syenite is the nepheline syenite which is an anhydrous sodium potassium aluminum silicate. One particular source for such minerals fillers is Indusmin Ltd. under the tradename MINEX.

The preferred class of mineral fillers are the clays. Clay minerals are well known and widely available commercially. Preferred clays are the crystalline and paracrystalline clays. Especially preferred are the crystalline clays, most preferably the Kaolin clays. The clays, particularly the Kaolin clays, may be in the hydrous form or in the calcined, anhydrous form. Exemplary of commercially available, suitable clays there may be given the clays available under the tradenames Whitex and Translink from Freeport Kaolin.

Additionally, it is preferred, although not required, to utilize such mineral fillers which have been treated with a titanate or silane coupling agent. Exemplary of such coupling agents there may be given vinyl tris 2-methoxy ethoxy silane and gamma-aminopropyl triethyoxy silane (A-1100, Union Carbide).

Most any combination of elastomer (a) and modifying combination of (b)(i) aromatic polyester and (b)(ii) mineral filler are intended to be within the scope of the present invention. However, because of the difficulty in employing high loadings of mineral fillers, it is preferred that no more than about 60 weight percent, preferably no more than about 40 weight percent, based on the total composition, of mineral filler (b)(ii) be used.

Generally, the compositions of the present invention will comprise from about 1 to 98 percent by weight, preferably from about 10 to 90 percent by weight, of elastomer (a) and from about 2 to about 99 percent by weight, preferably from about 10 to about 90 percent by weight of the combination (b) wherein the aromatic polyester component (b)(i) comprises from about 1 to about 99 percent by weight, preferably from about 5 to about 95 percent by weight, based on the total weight of (a) & (b) and the mineral filler comprises from about 1 to about 60 percent by weight, preferably 5 to about 40 percent by weight, based on the total weight of (a) & (b).

An especially preferred class of compositions encompassed by the present invention having excellent stress-strength properties, particularly as minifested by Dynatup characterization and heat sag resistance, are those wherein the amount of the combination of (b)(i) and (b)(ii) mineral filler present will be from about 10 to about 80 percent based on the total weight of (a) and (b) wherein (b)(i) and (b)(ii) will each be present in an amount of from about 5 to about 75 and from about 5 to about 25 weight percent, respectively, based on (a) & (b). Preferred compostions are those wherein the combined weight of (b)(i) and (b)(ii) is from about 30 to about 70 weight percent and wherein (b)(i) and (b)(ii) are present in amounts of from about 20 to about 60 and about 10 to about 20 weight percent, respectively, based on the total weight of (a) & (b).

Additionally, the compositions of the present invention may be suitably admixed with other additives including for example antioxidants elasticizers, pigments, flame retardants, and the like as necessary.

The compositions of the present invention may be prepared by any of the well known techniques for preparing polymer blends or admixtures, with extrusion blending being preferred. Suitable devices for the blending include single screw extruders, twin screw extruders, internal mixers such as the Bambury Mixer, heated rubber mills (electric or oil heat) or Farrell continuous mixers. Injection molding equipment can also be used to accomplish blending just prior to molding, but care must be taken to provide sufficient time and aggitation to insure uniform blending prior to molding.

Alternative methods include dry blending prior to extrusion or injection molding as well as precompounding of two ingredients, particularly the thermoplastic polyester (b)(i) and mineral filler (b)(ii) prior to mixing with the thermoplastic elastomer (a).

The polymer compositions prepared in accordance with the present invention are suitable for a broad range of molding applications. The preferred compositions have excellent heat sag resistance so as to allow for their use in painted articles which must be baked in ovens. Additionally, these compositions have excellent Dynatup properties such that when stuck, they "give" to the impinging energy and "spring back" after the energy is removed. Thus, these compositions are especially suitable for use in automotive applications, as for example, in fenders or bumpers.

The following examples are given as exemplary of the present invention and are not to be construed as limiting thereto.

DETAILED DESCRIPTION OF THE PREFERRED EMBODIMENTS

The following ASTM methods were used in determining the physical characteristics of the compositions:

| | |
|---|---|
| Flexural Modulus | ASTM D790 |
| Tensile Elongation | ASTM D638 |
| Shore D Hardness | ASTM D2240 |
| Notched Izod | ASTM D256 |
| Unnotched Izod | ASTM D256 |

All compositions were prepared by melt blending the thermoplastic elastomer with the thermoplastic aromatic polyester and kaolin clay in a Prodex single screw extruder.

PEIE A–D

PEIE A–D are polyether imide esters prepared from butanediol, dimethylterephthalate, poly(propylene ether)diamine (ave MW 2000) and trimellitic anhydride, wherein the weight ratio of dimethylterephthalate to diimide diacid was such as to produce polymers of flexural modulus as follows:

| | |
|---|---|
| PEIE A | 10,000 psi |
| PEIE B | 15,000 psi |
| PEIE C | 16,000 psi |
| PEIE D | 50,000 psi |

PEEI

PEIE E is a polyetherimide ester prepared from butanediol, dimethylterephthalate and copoly(propylene ether-ethylene ether)diamine (ave MW 900) and trimellitic anhydride, wherein the weight ratio of dimethylterephthalate to diimide diacid was such as to provide a polymer of 15,000 psi.

PEEI

PEEI is a polyetherester imide prepared in accordance with Wolfe Jr., above, from 32.5 parts by weight trimellitic anhydride, 13 parts by weight glycine, 23 parts by weight poly(tetramethylene ether)glycol (ave MW 1000), 31 parts by weight butanediol and 0.5 parts by weight stabilizer with a titanate ester catalyst.

EXAMPLES 1–13

Compositions within the scope of the present invention were prepared demonstrating blends of polyether ester imide with modifying amounts of poly(butylene terephthalate) and kaolin clay across a broad range of weight ratios. The specific makeup and physical properties of these compositions were as presented in Table 1.

A quick glance at Table 1 reveals that the compositions of the present invention have a wide array of physical properties depending upon their compositional makeup. Consequently, the selection of any one formulation for a particular application will vary accordingly. Briefly, from Table 1 it is apparent that while all compositions have good impact strength, best impact strength is obtained where at least about 30 weight percent of the elastomer is present. Similarly with high loadings of elastomer, moderate levels of polyester and low levels of clay, the compositions have excellent Dynatup properties which enable parts molded therefrom to absorb high energy on impact, without rupture and to "spring back" to its original shape with little, if any, deformation. Contrary to these observations, examples with low loadings of elastomer and clay and high loadings of polyester as well as low loadings of elastomer and moderate loadings of both polyester and clay had superior heat sag resistance. Most preferred of these compositions are examples 1–6 which have a most desirable combination of Dynatup properties, heat sag resistance and impact strength.

TABLE 1

| | 1 | 2 | 3 | 4 | 5 | 6 | 7 | 8 | 9 | 10 | 11 | 12 | 13 |
|---|---|---|---|---|---|---|---|---|---|---|---|---|---|
| PEIE B | 89.3 | 69.3 | 69.3 | 54.3 | 30 | 20 | 10 | 10 | 20 | 30 | 30 | 39.3 | 54.3 |
| PBT$^a$ | 5 | 20 | 10 | 20 | 59.3 | 24.3 | 79.3 | 30 | 40 | 10 | 44.3 | 30 | 5 |
| Clay$^b$ | 5 | 10 | 20 | 25 | 10 | 5 | 10 | 59.3 | 39.3 | 59.3 | 25 | 30 | 40 |
| Stabilizer$^c$ | 0.7 | 0.7 | 0.7 | 0.7 | 0.7 | 0.7 | 0.7 | 0.7 | 0.7 | 0.7 | 0.7 | 0.7 | 0.7 |
| Notched Izod ⅛" ft lb/in | NB | 3.95 | 4.7 | 4.05 | 3.8 | 3.5 | 2.4 | — | 2.1 | 2.75 | 2.95 | 3.2 | 3.3 |
| Unnotched Izod −30° C., ft lb/in | NB | NB | NB | NB | NB | NB | 34.7 | — | 21.3 | 28.3 | 35 | 30.3 | 35.6 |
| Flexural Modulus psi × 10$^3$ | 17 | 114.6 | 47.7 | 59.3 | 117.7 | 172 | 110.2 | — | 224.1 | 84.9 | 151.8 | 150.2 | 65.8 |
| Tensile Elongation % | 171 | 119 | 109 | 100 | 124 | 398 | 109 | — | 29 | 43 | 57 | 43 | 43 |
| Heat Sag, mm −290° F., 30 min | 39 | 35 | 31 | 29 | 26 | 27 | 18 | — | 13 | 20 | 19 | 18 | 22 |
| Dynatup, −30° C. $E_{max}/E_{total}$ | 21/31 | 23/32 | 23/26 | 24/25 | 25/36 | 21/32 | 11/11 | — | 3/4 | 4/4 | 13/13 | 7/7 | 8/8 |

$^a$poly(butylene terephthalate) available as VALOX ® resin from General Electric Company
$^b$treated kaolin clay sold as Translink form Freeport Kaolin
$^c$stabilizer package containing phenolic and phosphite stabilizers

EXAMPLES 14–21

An additional series of compositions were prepared to further demonstrate the breadth of the present invention. The specific makeup and physical properties of these compositions were as presented in Table 2.

Examples 14 and 15 demonstrate the affect the melt viscosity of the virgin elastomer has on the compositions of the present invention. As is evident, little effect is seen in most elastomeric properties; however, with the lower melt viscosity elastomer, elongation suffers quite noticeably.

Examples 16 through 19 demonstrate the impact the flexural modulus of the virgin polyetherimide ester elastomer has on the properties. Specifically, comparison of examples 16 and 17 with 18 and 19, respectively shows that some loss of impact strength occurs but is offset by a marked increase in heat sag resistance with the higher flex modulus elastomers. It is also important to note that at low loadings of a high flexural modulus elastomer the superior dynatup properties of the preferred compositions of the present invention are adversely affected.

Finally, examples 20 and 21 demonstrate the present invention utilizing elastomers derived from poly(propylene ether)diamine and copoly(propylene ether-ethylene ether)diamine respectively. As is evident, the former composition excels with respect to impact strength and Dynatup properties whereas the latter composition has markedly superior tensile elongation and heat sag resistance.

TABLE 2

|  | 14 | 15 | 16 | 17 | 18 | 19 | 20 | 21 |
|---|---|---|---|---|---|---|---|---|
| PEIE A | — | — | 44.3 | 24.3 | — | — | — | — |
| PEIE B* | 48.9 | 48.9 | — | — | — | — | 49.3 | — |
| PEIE C | — | — | — | — | 44.3 | — | — | — |
| PEIE D | — | — | — | — | — | 24.3 | — | — |
| PEIE E | — | — | — | — | — | — | — | 49.3 |
| PBT[a] | 35 | 35 | 40 | 60 | 40 | 60 | 35 | 35 |
| Clay[b] | 15 | 15 | 15 | 15 | 15 | 15 | 15 | 15 |
| Stabilizer[c] | 1.1 | 1.1 | 0.7 | 0.7 | 0.7 | 0.7 | 0.7 | 0.7 |
| $\frac{1}{4}''$ Notched Izod ft lb/in | 4.2 | 3.6 | 4.8 | 2.8 | 3.8 | 1.3 | 4.3 | 3.1 |
| $\frac{1}{4}''$ Unnotched Izod $-30°$ C., ft lb/in | NB | NB | NB | NB | NB | 26 | NB | 15.2 |
| Flexural Modulus $\times 10^3$, psi | 93.7 | 85.9 | 118 | 226 | 156 | 316 | 97.6 | 83.4 |
| Tensile Elongation % | 212 | 130 | 140 | 120 | 150 | 125 | 162 | 202 |
| Heat Sag, 290° F. 30 min, mm | 32 | 35 | 24 | 15 | 17 | 10 | 23 | 15 |
| Dynatup, $-30°$ C. | 27/39 | 27/36 | 25/35 | 27/37 | 26/35 | 15/16 | 26/35 | 4/4 |

[a,b,c] See table 1 above.
*PEIE B of example 15 had lower melt viscosity then in example 14.

EXAMPLES 24–25

A final set of examples within the scope of the present invention were prepared utilizing both the polyetherimide esters of McCready, above, and the polyether ester imides of Wolfe Jr., above. The makeup of these compositions and the physical properties thereof were as shown in Table 3. These examples further demonstrate the breadth and utility of the present invention.

TABLE 3

|  | 24 | 25 |
|---|---|---|
| PEIE B | 49.3 | — |
| PEEI | — | 49.3 |
| PBT[a] | 35 | 35 |
| Clay[b] | 15 | 15 |
| Stabilizer[c] | 0.7 | 0.7 |
| NI ft lb/in |  |  |
| NI, $-30°$ C. ft lb/in |  |  |
| Flexural Modulus |  |  |
| Heat Sag |  |  |
| Dynatup, $-30°$ C. |  |  |

[a,b,c] See footnotes in Table 1, above.

Obviously, other modifications will suggest themselves to those skilled in the art in light of the above, detailed description. All such modifications are within the full intended scope of the present invention as defined by the appended claims.

I claim:

1. A thermoplastic molding composition comprising:
(a) one or more thermoplastic elastomeric polymers characterized as having ether, ester and imide linkages and wherein the ether linkages are present as high molecular weight, i.e. MW of from about 400 to about 12000, polyoxyalkylene or copolyoxyalkylene units derived from long chain ether glycols or long chain ether diamines, and
(b) a modifying amount of a combination of
(i) an aromatic thermoplastic polyester and
(ii) a mineral filler selected from the group consisting of clay and syenite.

2. The composition of claim 1 wherein the thermoplastic elastomeric polymer is a polyetherimide ester derived from (i) one or more diols (ii) one or more dicarboxylic acids or the ester derivative thereof and (iii) one or more poly(oxyalkylene) diimide diacids or the reactants therefore.

3. The composition of claim 2 wherein the diols are selected from the group consisting of $C_2$ to $C_{19}$ aliphatic and cycloaliphatic diols and at least 60 mole percent of the diols are the same.

4. The composition of claim 2 wherein the diols are selected from the group consisting of $C_2$ to $C_8$ aliphatic and cycloaliphatic diols and at least 80 mole percent of the diols are the same.

5. The composition of claim 2 wherein the diol is 1,4 butanediol.

6. The composition of claim 2 wherein at least 60 mole percent of the dicarboxylic acids are the same and are selected from the group consisting of $C_4$ to $C_{19}$ aliphatic, cycloaliphatic and/or aromatic dicarboxylic acids and the ester derivative thereof.

7. The composition of claim 2 wherein at least 80 mole percent of the dicarboxylic acids are the same and are selected from the group consisting of $C_4$ to $C_{16}$ aliphatic, cycloaliphatic or aromatic dicarboxylic acids and the ester derivatives thereof.

8. The composition of claim 6 wherein the predominant dicarboxylic acid is a $C_8$ to $C_{16}$ aromatic dicarboxylic acid or the ester derivative thereof.

9. The composition of claim 7 wherein the predominant dicarboxylic acid is a $C_8$ to $C_{16}$ aromatic dicarboxylic acid or the ester derivative thereof.

10. The composition of claim 2 wherein the dicarboxylic acid is an aromatic dicarboxylic acid selected from the group consisting of phthalic acid, isophthalic acid, terephthalic acid and the ester derivatives thereof.

11. The composition of claim 2 wherein the dicarboxylic acid is dimethyl terephthalate.

12. The composition of claim 2 wherein the polyetherimide ester is prepared from a preformed poly(oxyalkylene) diimide diacid characterized as having the following formula:

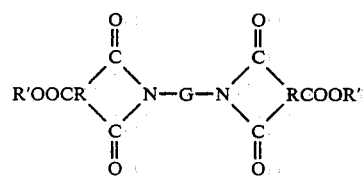

or the reactants therefor comprising monomers of the following formulas:

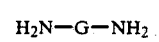

-continued and

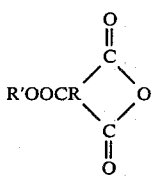

wherein each R is independently a $C_2$ to $C_{20}$ aliphatic, cycloaliphatic or aromatic trivalent organic radical; each R' is independently hydrogen or a $C_1$ to $C_6$ monovalent organic radical, and G is the radical remaining after removal of the terminal amino groups of a long chain ether diamine having a molecular weight of from about 400 to about 12,000.

13. The composition of claim 12 wherein R is a $C_6$ to $C_{20}$ aromatic trivalent organic radical, R' is hydrogen or methyl and G is derived from a long chain ether diamine having a molecular weight of from about 900 to about 4000.

14. The composition of claim 12 wherein the long chain ether diamine is selected from the group consisting of poly(ethylene ether) diamine, poly(propylene ether) diamine and poly(tetramethylene ether) diamine and copoly(ethylene ether-propylene ether) diamine.

15. The composition of claim 12 wherein the long chain ether diamine is poly(propylene ether)-diamine.

16. The composition of claim 12 wherein R is a $C_6$ aromatic trivalent radical derived from trimellitic anhydride.

17. The composition of claim 12 wherein the polyetherimide ester is derived from a preformed poly(oxyalkylene) diimide diacid which is the reaction product of trimellitic anhydride and poly(propylene ether) diamine having a molecular weight of from about 900 to about 4000.

18. The composition of claim 1 wherein the thermoplastic elastomeric polymer is selected from elastomeric polymers characterized as comprising units of the formulas:

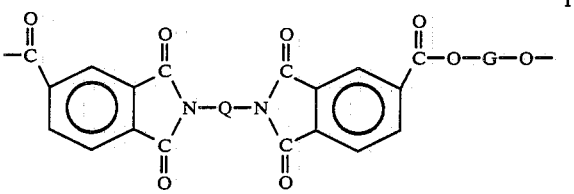

and

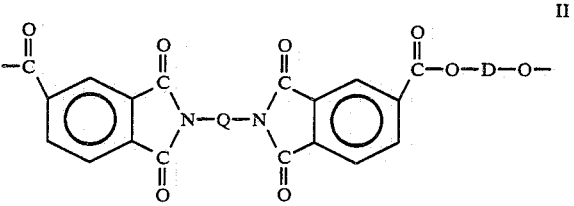

or

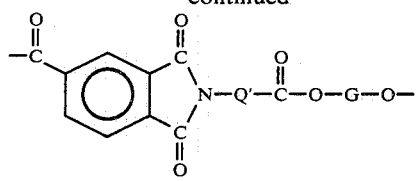

and

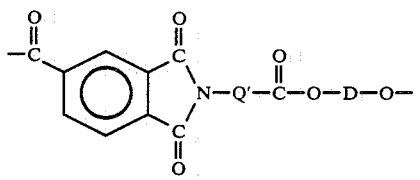

or mixtures thereof wherein G is a divalent radical remaining after the removal of terminal (or as nearly terminal as possible) hydroxyl groups from a long chain poly(oxyalkylene)glycol having a molecular weight of from about 400 to about 12,000; D is a divalent radical remaining after the removal of hydroxyl groups from a diol having a molecular weight less than about 300; Q is a divalent radical remaining after removal of amino groups from an aliphatic primary diamine having a molecular weight of less than 350 and Q' is a divalent radical remaining after removal of an amino group and a carboxyl group from an aliphatic primary amino acid having a molecular weight of less than 250, with the proviso that from about 0.5 to about 10 D units are present for each G unit.

19. The composition of claim 1 wherein the aromatic thermoplastic polyester (b) is selected from the group consisting of aromatic homopolyesters, aromatic copolyesters and mixtures of said homopolyesters and/or copolyesters which are characterized as comprising repeating units of the following formula:

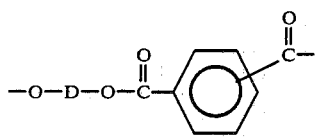

wherein D is the radical remaining after removal of the hydroxy groups of a $C_2$ to $C_8$ aliphatic or cycloaliphatic diol, with the proviso that at least about 80 mole percent of the units in the copolyesters are of the aromatic ester units.

20. The composition of claim 19 wherein D is the radical remaining after removal of the hydroxy groups of a $C_2$ to $C_6$ aliphatic diol.

21. The composition of claim 19 wherein the high molecular weight thermoplastic polyester is selected from the group consisting of poly(ethylene terephthalate), poly(butylene terephthalate), poly(butylene terephthalate-co-isophthalate) and blends thereof.

22. The composition of claim 21 wherein the high molecular weight thermoplastic polyester (b) is poly(butylene terephthalate).

23. The composition of claim 1 wherein the mineral filler is clay.

24. The composition of claim 23 wherein the clay is a treated kaolin clay.

25. The composition of claim 1 which comprises from about 1 to about 98 weight percent of the thermoplastic elastomer (a) and from about 2 to 99 weight percent of the modifying combination (b) wherein the aromatic thermoplastic polyester (b)(i) and the mineral filler (b)(ii) are each present in an amount of from about 1 to about 98 weight percent and from about 1 to about 60 weight percent, respectively, based on the combined weight of (a) & (b).

26. The composition of claim 1 which comprises from about 10 to about 90 weight percent of the thermoplastic elastomer (a) and from about 90 to 10 weight percent of the modifying combination (b) wherein the aromatic thermoplastic polyester (b)(i) and the mineral filler (b)(ii) are each present in an amount of from about 5 to about 85 weight percent and from about 5 to about 40 weight percent, respectively, based on the combined weight of (a) & (b).

27. The composition of claim 1 which comprises from about 20 to about 90 weight percent of the thermoplastic elastomer (a) and from about 10 to 80 weight percent of the modifying combination (b) wherein the aromatic thermoplastic polyester (b)(i) and the mineral filler (b)(ii) are each present in an amount of from about 5 to about 75 weight percent and from about 5 to about 25 weight percent, respectively, based on the combined weight of (a) & (b).

28. The composition of claim 1 which comprises from about 30 to about 70 weight percent of the thermoplastic elastomer (a) and from about 70 to 30 weight percent of the modifying combination (b) wherein the aromatic thermoplastic polyester (b)(i) and the mineral filler (b)(ii) are each present in an amount of from about 20 to about 60 weight percent and from about 10 to about 20 weight percent, respectively, based on the combined weight of (a) & (b).

29. A thermoplastic molding composition comprising:
(a) one or more thermoplastic elastomeric polymers characterized as having ether, ester and imide linkages and wherein the ether linkages are present as high molecular weight, i.e. MW of from about 400 to about 12000, polyoxyalkylene or copolyoxyalkylene units derived from long chain ether glycols or long chain ether diamines and
(b) from about 10 to about 80 weight percent based on a & b, of a combination of
(i) poly(butylene terephthalate) and
(ii) kaolin clay, wherein the poly(butylene terephthalate and kaolin clay are each present in an amount of from about 5 to about 75 weight percent and from about 5 to about 25 weight percent, respectively, based on (a) & (b).

30. The composition of claim 29 wherein the composition comprises from about 30 to 70 weight percent, based on a & b, of the combination (b) and wherein the poly(butylene terephthalate) and kaolin clay are each present in an amount of from about 20 to about 60 weight percent and from about 10 to about 20 weight percent, respectively, based on (a) & (b).

31. The composition of claim 29 wherein the thermoplastic elastomer (a) is derived from (i) butanediol, (ii) dimethylterephthalate and a poly(oxyalkylene) diimide diacid which is derived from trimellitic anhydride and a poly(oxyalkylene) diamine having a molecular weight of from about 900 to about 4000.

32. The composition of claim 31 wherein the poly(oxyalkylene) diamine is selected from the group consisting of poly(propylene ether) diamine, poly(tetramethylene ether) diamine and copoly(propylene ether-ethylene ether) diamine.

33. The composition of claim 31 wherein the poly(oxyalkylene) diamine is poly(propylene ether) diamine.

* * * * *